US008897095B2

(12) United States Patent
Tsurugaya et al.

(10) Patent No.: US 8,897,095 B2
(45) Date of Patent: Nov. 25, 2014

(54) OBJECT PROBING DEVICE, OBJECT PROBING PROGRAM, AND OBJECT PROBING METHOD

(75) Inventors: Yoshiaki Tsurugaya, Minato-ku (JP); Toshiaki Kikuchi, Yokosuka (JP)

(73) Assignees: NEC Corporation, Tokyo (JP); Toshiaki Kikuchi, Kanagawa (JP)

( * ) Notice: Subject to any disclaimer, the term of this patent is extended or adjusted under 35 U.S.C. 154(b) by 812 days.

(21) Appl. No.: 13/127,884

(22) PCT Filed: Nov. 5, 2009

(86) PCT No.: PCT/JP2009/068925
§ 371 (c)(1),
(2), (4) Date: Jul. 12, 2011

(87) PCT Pub. No.: WO2010/053136
PCT Pub. Date: May 14, 2010

(65) Prior Publication Data
US 2011/0261653 A1    Oct. 27, 2011

(30) Foreign Application Priority Data
Nov. 7, 2008  (JP) ................................. 2008-287202

(51) Int. Cl.
G01S 3/80       (2006.01)
G01S 15/46      (2006.01)
G01S 7/526      (2006.01)

(52) U.S. Cl.
CPC  *G01S 7/526* (2013.01); *G01S 15/46* (2013.01)
USPC ........................................................ 367/126

(58) Field of Classification Search
USPC .................. 367/7, 99, 126; 340/553; 342/195
See application file for complete search history.

(56) References Cited

U.S. PATENT DOCUMENTS 5,122,990 A * 6/1992 Deines et al. ................. 367/100
5,208,785 A * 5/1993 Brumley et al. ................ 367/90
(Continued)

FOREIGN PATENT DOCUMENTS

EP     1 975 645 A2    10/2008
JP     2008-249532 A   10/2008
(Continued)

OTHER PUBLICATIONS

Prada, Claire, et al., "Decomposition of the time reversal operator: Detection and selective focusing on two scatterers," J. Acoust. Soc. Am., pp. 2067-2076, Apr. 1996, vol. 99 (4), Pt. 1.

(Continued)

*Primary Examiner* — Isam Alsomiri
*Assistant Examiner* — Hovhannes Baghdasaryan
(74) *Attorney, Agent, or Firm* — Sughrue Mion, PLLC

(57) ABSTRACT

An object probing device includes: a sound source which projects a sound pulse within a propagation environment; a transducer array disposed in a region for receiving the forward scattered wave scattered forward from the object existing in the propagation environment; an addition processing unit which extracts only a signal of the forward scattered wave by applying vector addition processing on a reference signal in a reference sound field received by the transducer array when the object does not exist in the propagation environment and a mixed signal in a probe sound field received when the object exists; a time reversal processing unit which generates a time-reversed sound pulse by applying time reversal processing on the extracted forward scattered wave; and a phase conjugation determination unit which checks whether or not a phase conjugacy is established in the propagation environment by employing a passive phase conjugation to the time-reversed sound pulse.

6 Claims, 9 Drawing Sheets

(56) References Cited

U.S. PATENT DOCUMENTS

| | | | | |
|---|---|---|---|---|
| 5,305,286 | A | * | 4/1994 | Woodsum et al. ............. 367/92 |
| 5,563,848 | A | * | 10/1996 | Rogers et al. ................. 367/99 |
| 2005/0146433 | A1* | | 7/2005 | Waltermann ................. 340/553 |
| 2006/0109743 | A1* | | 5/2006 | Kosalos et al. ................ 367/88 |
| 2006/0133211 | A1* | | 6/2006 | Yang ............................ 367/154 |
| 2006/0164270 | A1* | | 7/2006 | Miller et al. ................. 341/143 |
| 2006/0227042 | A1* | | 10/2006 | Budic .......................... 342/195 |
| 2007/0040729 | A1* | | 2/2007 | Ohnishi ......................... 342/93 |
| 2007/0071077 | A1* | | 3/2007 | Yang ............................ 375/218 |
| 2007/0140499 | A1* | | 6/2007 | Davis ............................. 381/23 |
| 2007/0159922 | A1* | | 7/2007 | Zimmerman et al. ........ 367/103 |
| 2007/0274152 | A1* | | 11/2007 | Rees ................................ 367/7 |
| 2008/0018521 | A1* | | 1/2008 | Sahinoglu et al. .............. 342/27 |
| 2008/0031463 | A1* | | 2/2008 | Davis ............................. 381/17 |
| 2008/0239873 | A1* | | 10/2008 | Tsurugaya et al. ............. 367/93 |
| 2009/0234230 | A1 | | 9/2009 | Bercoff et al. |

FOREIGN PATENT DOCUMENTS

| | | |
|---|---|---|
| JP | 2009-219876 A | 10/2009 |
| WO | 2010/053137 A1 | 5/2010 |

OTHER PUBLICATIONS

Minonzio, Jean-Gabriel, et al., "Multiple scattering between two elastic cylinders and invariants of the time-reversal operator: Theory and experiment," J. Acoust. Soc. Am. pp. 875-883, Aug. 2006, vol. 120 (2).

Extended European Search Report dated May 3, 2012 issued by the European Patent Office in Application No. 09824835.4.

* cited by examiner

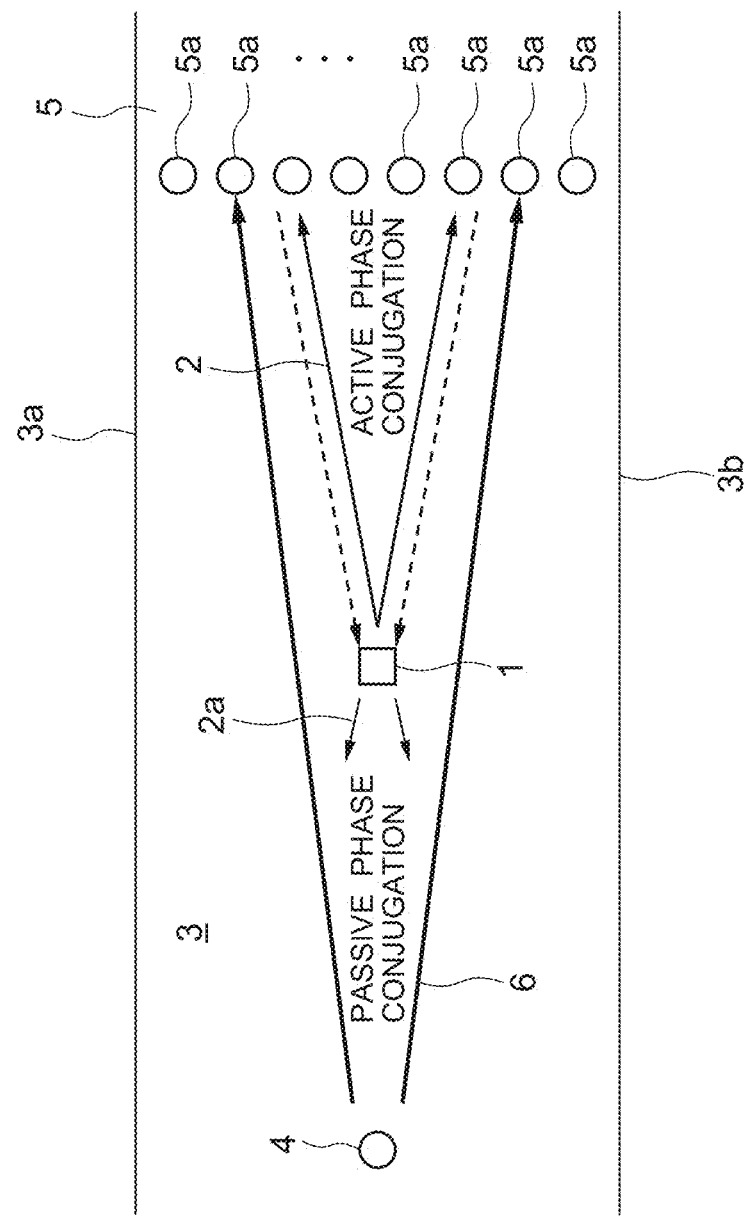

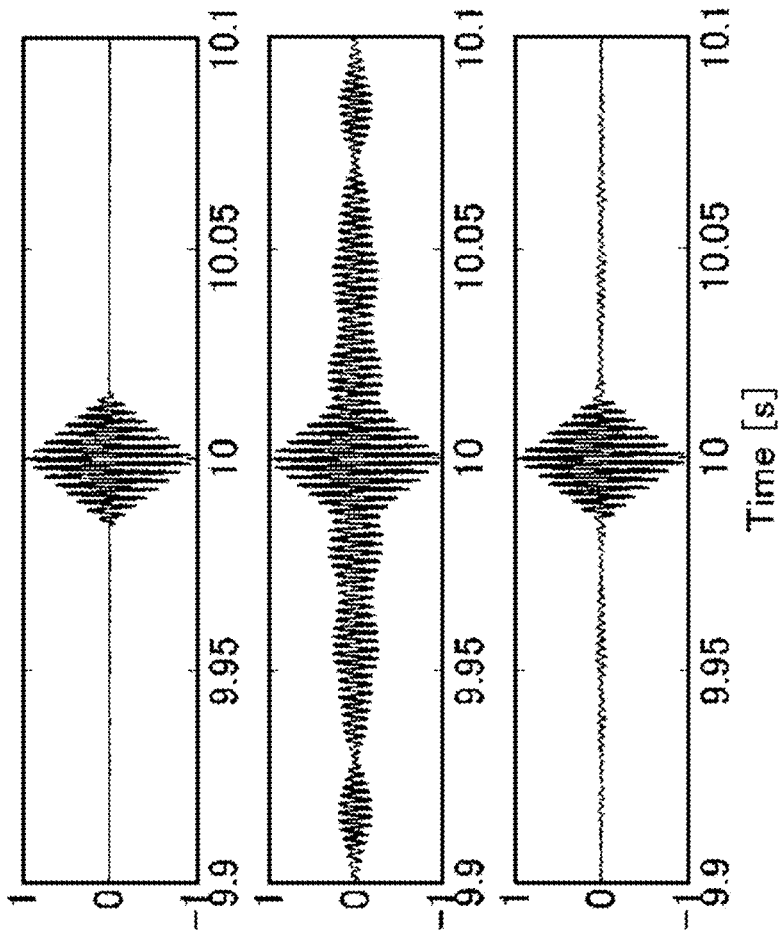

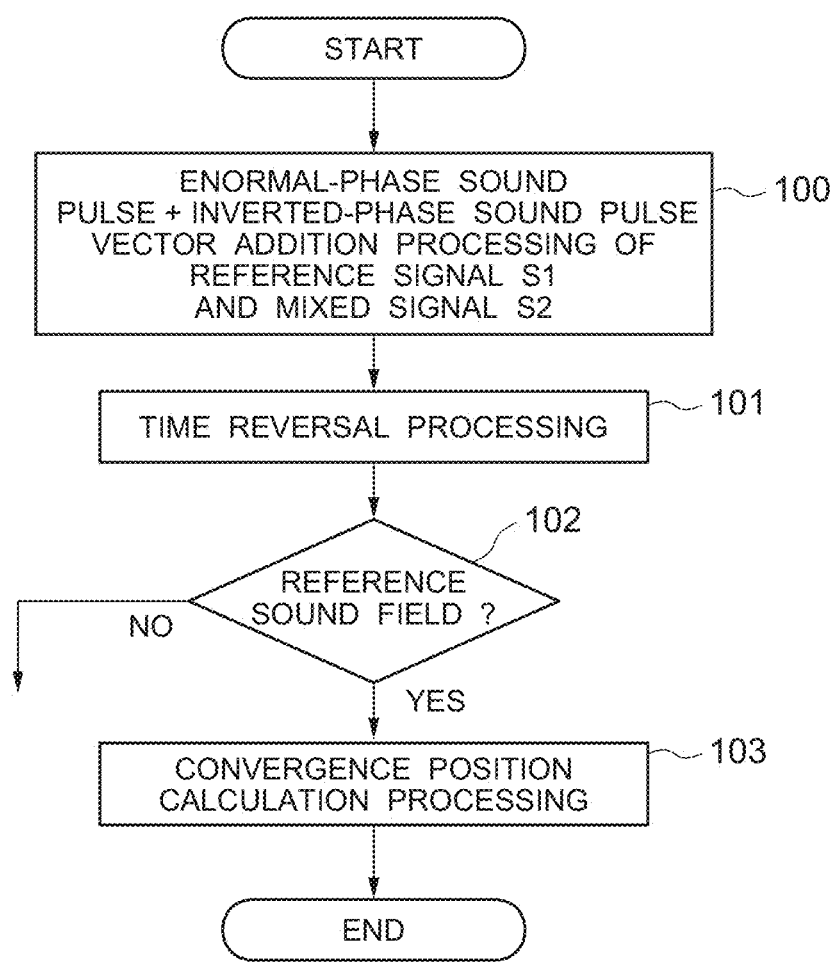

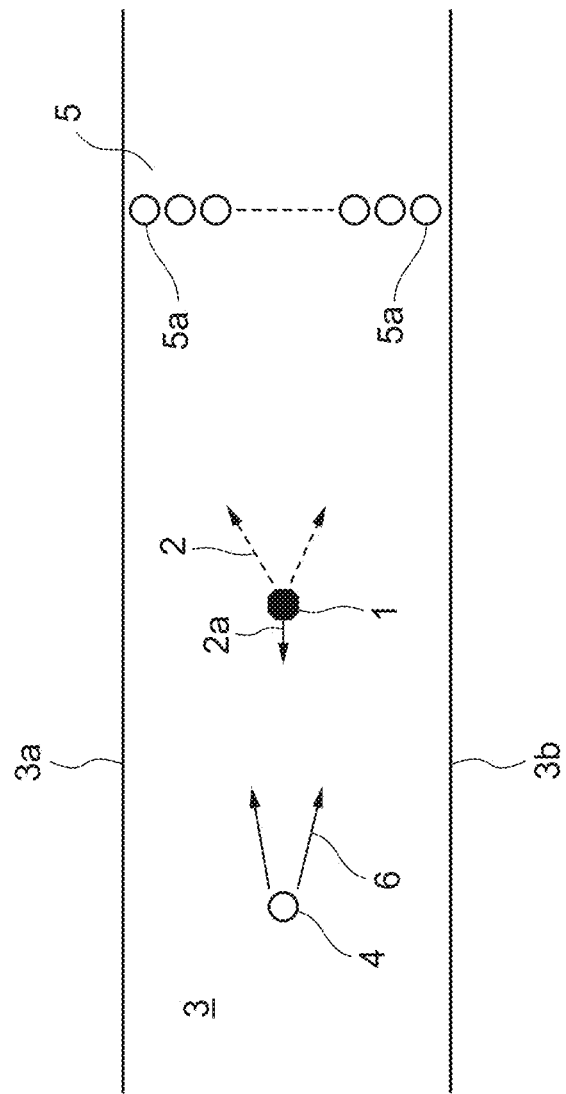

OBJECT PROBING DEVICE, OBJECT PROBING PROGRAM, AND OBJECT PROBING METHOD

CROSS REFERENCE TO RELATED APPLICATIONS

This application is a National Stage of International Application No. PCT/JP2009/068925 filed Nov. 5, 2009, which claims priority from Japanese Patent Application No. 2008-287202 filed Nov. 7, 2008, the contents of all of which are incorporated herein by reference in their entirety.

TECHNICAL FIELD

The present invention relates to an object probing device, an object probing program, and an object probing method for probing an object existing in a propagation environment where a sound pulse propagates.

BACKGROUND ART

When the propagation environment where the sound pulse propagates is the underwater, for example, a sonar is widely used as a method for probing objects existing in the underwater. That is, the distance and direction of an object are acquired through sweeping the underwater by using a sonic beam and receiving a reflected wave from the object that comes within the sonic beam. For extending the probing distance, it is necessary to use a low frequency sonic wave (e.g., 500 Hz) of a small absorption attenuation. However, when the frequency of the sonic wave is lowered, the sonic beam becomes widened and further increases an influence by reflections at the sea surface and the seabed, thereby making it difficult to probe the object.

Therefore, recently, there has been an increasing interest in a new object probing method using phase conjugated waves and time reversal waves.

C. Prada et al. perform so-called the time reversal processing which receives backward scattered waves scattered from an object existing in the water towards a sound source side and reverses the time axis of the received wave signal, and re-radiates the time reversal signal into the water. The re-radiated sonic wave converges to the position of the object. The converged sonic wave generates a reflection wave stronger than before. The reflected wave is received, and the time reversal processing is performed thereon again to be re-radiated. The sonic wave strongly converges to the position of the object.

Through repeating the above-described operation, it is possible to specify objects in order from larger ones to smaller ones.

Non-Patent Document 1: C. Prada, S. Manneville, D. Spoliansky, and M. Fink, "Do composition of the time reversal operator: detection and selective focusing on two scatterers", J. Acoust. Soc. Am. 99, 2067-2076 (1995)

DISCLOSURE OF THE INVENTION

Problems to be Solved by the Invention

However, with the method proposed by C. Prada et al., it is necessary to repeat the time reversal processing twice or more. Thus, it requires a tremendous amount of time for probing an object.

Further, in a case where objects exist neighboring to each other or in a case where the sizes of the objects are equal, it is difficult to identify each object. Further, in a case where the frequency of the sonic wave used for probing is low, it becomes difficult to identify the objects due to an influence of reflections at the sea surface and the seabed.

An object of the present invention is to provide an object probing device, an object probing program, and an object probing method for probing objects existing in a propagation environment by using forward scattered waves scattered forward from the objects instead of backward scattered waves from the objects and by employing time reversal waves of the forward scattered waves.

Means for Solving the Problems

In order to achieve the foregoing object, the object probing device according to the present invention is an object probing device for probing an object existing in a propagation environment, which probes the object by using a forward scattered wave scattered forward from the object, and the device is characterized to include:
 a sound source which projects a sound pulse within the propagation environment;
 a transducer array disposed in a region for receiving the forward scattered wave scattered forward from the object existing in the propagation environment;
 an addition processing unit which extracts only a signal of the forward scattered wave by applying vector addition processing on a reference signal in a reference sound field received by the transducer array under a state where the object does not exist in the propagation environment and a mixed signal in a probe sound field received by the transducer array under a state where the object exists in the propagation environment;
 a time reversal processing unit which generates a time-reversed sound pulse by applying time reversal processing on the forward scattered wave extracted by the addition processing unit; and
 a phase conjugation determination unit which checks whether or not a phase conjugacy is established in the propagation environment from the sound source to the transducer array by employing a passive phase conjugation to the sound pulse generated by the time reversal processing unit.

In the above case, while the present invention is built as the object probing device as hardware, the present invention is not limited only to such case. The present invention can be built as a method or a program as software which causes a computer to execute the functions of the object probing device.

The object probing program according to the present invention is an object probing program for controlling probing of an object existing in a propagation environment, which is characterized to cause a computer to execute:
 a function which extracts only a signal of the forward scattered wave by applying vector addition processing on a reference signal in a reference sound field received by a transducer array under a state where the object does not exist in the propagation environment and a mixed signal in a probe sound field received by the transducer array under a state where the object exists in the propagation environment;
 a function which generates a time-reversed sound pulse by applying time reversal processing on the extracted forward scattered wave; and
 a function which checks whether or not a phase conjugacy is established in the propagation environment from a sound source to the transducer array by employing a passive phase conjugation to the time-reversed sound pulse.

The object probing method according to the present invention is an object probing method for probing an object existing in a propagation environment, which probes the object by using a forward scattered wave scattered forward from the object. The method is characterized to include:

projecting a sound pulse within the propagation environment;

extracting only a signal of the forward scattered wave by applying vector addition processing on a reference signal in a reference sound field received by the transducer array under a state where the object does not exist in the propagation environment and a mixed signal in a probe sound field received by the transducer array under a state where the object exists in the propagation environment;

generating a time-reversed sound pulse by applying time reversal processing on the extracted forward scattered wave; and checking whether or not a phase conjugacy is established in the propagation environment from a sound source to the transducer array by employing a passive phase conjugation to the time-reversed sound pulse.

Effect of the Invention

With the present invention, the object in the propagation environment is probed through extracting the forward scattered waves scattered forward at the object by applying vector addition processing on the reference signal acquired in the reference sound field and the mixed signal acquired in the probe sound field, and through applying the time reversal processing on the extracted forward scattered waves to be converged to the position of the object. Further, passive phase conjugation is employed for determining the reference sound field to check that the phase conjugacy is established in the propagation environment from the sound source to the transducer array, and the object within the propagation environment is probed based on the reference signal and the probe sound field on condition that the phase conjugacy is established. Therefore, it is possible with the present invention to probe the object accurately and surely.

BEST MODES FOR CARRYING OUT THE INVENTION

Hereinafter, exemplary embodiments of the invention will be described in details by referring to the drawings.

There are the aforementioned issues in the method proposed by C. Prada et al., i.e., the method which repeats the time reversal processing on the backward scattered waves which scatter (reflect) backward from an object. Thus, as a method that overcomes such issues, the exemplary embodiment of the invention proposes a method which achieves probing of the object by using forward scattered waves scattered forward from the object. For explaining the exemplary embodiment of the invention by referring to FIG. 1 and FIG. 2, a reference sound field, a reference signal, a probe sound field, and a mixed signal are defined as follows. Under a layout of a sound source 4 and a transducer array 5 shown in FIG. 2, a sound pulse is projected from the sound source 4 in a state where an object 1 as a probing target does not exist within a propagation environment 3, and the sound pulse is received by the transducer array 5. The sound field of that condition is defined as the reference sound field. The sound pulse received by the transducer array 5 in the reference sound field is defined as a reference signal S1. Then, in a state where the object 1 as the probing target exists within the propagation environment 3, the sound pulse is projected from the sound source 4, and it is received by the transducer array 5. The sound filed of that condition is defined as the probe sound field. The sound pulse received by the transducer array 5 in the probe sound field is defined as a mixed signal S2.

First, the relation between a backward scattered wave 2a scattered backward from the object 1 and a forward scattered wave 2 scattered forward from the object 1 will be described by referring to FIG. 5. As shown in FIG. 5, assuming that the propagation environment 3 where a sound pulse propagates is a shallow water, a scattered wave scattered from the object 1 existing in the shallow water 3 towards the sound source 4 side, i.e., the scattered wave scattered backward, is the backward scattered wave 2a, and the scattered wave scattered from the object 1 towards the transducer array 5 side, i.e., scattered forward, is the forward scattered wave 2. In a case where the propagation environment 3 is the shallow water, 3a is the sea surface and 3b is the seabed.

In general, the level of a sound pulse (traveling wave 6) directly travelling in the shallow water 3 towards the transducer array 5 is greater than the level of the forward scattered wave 2 scattered forward from the object 1. Thus, it is difficult to isolate the forward scattered wave 2 from the received sound pulse and discriminate the forward scattered wave 2.

Therefore, the exemplary embodiment of the invention isolates only the forward scattered wave 2 from the object 1 based on the reference signal S1 in the reference sound field and the mixed signal S2 in the probe sound field, and performs time reversal processing on the isolated forward scattered wave 2 to probe the object 1 existing within the propagation environment 3.

That is, the exemplary embodiment of the invention is characterized to probe the object 1 existing within the propagation environment 3 by extracting the forward scattered wave 2 from the object 1 based on the reference signal and the mixed signal in the layout of the sound source 4 and the transducer array 5 shown in FIG. 2. For extracting the forward scattered wave 2 from the object 1 based on the reference signal and the mixed signal, it is important that the phase conjugacy is established in the propagation environment 3 from the sound source 4 to the transducer array 5. As shown in FIG. 2, the phase conjugation includes active phase conjugation related to the outgoing and incoming paths between the sound source 4 and the transducer array 5 as well as passive phase conjugation related only to the outgoing path from the sound source 4 to the transducer array 5. The passive phase conjugation is applied for determining the reference sound field.

Next, the basic theory of the exemplary embodiment according to the invention will be described.

It is assumed a case where the propagation environment 3 shown in FIG. 2 is a shallow water such as a continental shelf, for example. As shown in FIG. 2, the sound source 4 and the transducer array 5 are disposed by opposing to each other in the shallow water 3. First, in a case where the object 1 does not exist between the sound source 4 and the transducer array 5, a sound pulse is radiated from the sound source 4 into the shallow water 3 by having the sound field of the shallow water as the reference sound field in that state and the sound pulse propagated in the shallow water 3 is received at each element 5a of the transducer array 5. The received signal is saved in each of element 5a of the transducer array 5. This signal is the reference signal S1 in the reference sound field.

Then, in a case where it is considered to have the object existing therebetween, a sound pulse of an inverted phase from the sound pulse radiated earlier is radiated from the sound source 4 into the shallow water 3 by having the sound field of the shallow water 3 in that state as the probe sound field. The sound pulse radiated earlier is the sound pulse radiated from the sound source 4 when acquiring the reference signal S1. The sound pulse propagated in the shallow water 3 in the probe sound field is received at each element 5a of the transducer array 5. This signal is the mixed signal S2 in the probe sound field.

Then, the mixed signal S2 received in the probe sound field and the reference signal S1 received in the reference sound field are added vectorially (vector addition processing). In this case, components (traveling waves 6) of the sound pulse itself radiated from the sound source 4 and received directly by the transducer array 5 are contained in the reference signal S1 and the mixed signal S2 in a relation of inverted phases from each other, so that those components cancel each other and disappear due to the vector addition processing. The relation of inverted phases from each other is a relation where the phase of the mixed signal S2 is an inverted phase, provided that the phase of the reference signal S1 is a normal phase.

The vector addition processing for the traveling wave 6 radiated from the sound source 4 is as described above. Processing for the forward scattered wave 2 scattered forward by the object 1 will now be described. Components of the forward scattered wave 2 that is the scattered wave of the sound pulse radiated from the sound source 4, made incident on the object 1, and scattered forward are contained in the mixed signal S2 received in the probe sound field but not contained in the reference signal S1 received in the reference sound field. Further, when the object 1 exists in the shallow water 3, the components of the forward scattered wave 2 are contained in the mixed signal S2 received in the probe sound field. Meanwhile, when the object 1 does not exist in the shallow water 3, the components of the forward scattered wave 2 are not contained in the mixed signal S2. The forward scattered wave 2 is extracted by utilizing the properties of those signals S1 an S2.

Thus, in the exemplary embodiment of the invention, the mixed signal S2 received in the probe sound field and the reference signal S1 received in the reference sound field are added in vectorially (vector addition processing). When the forward scattered wave 2 is contained in the mixed signal S2 as a result of performing the vector addition processing, the components of the forward scattered wave 2 are not cancelled even by the vector addition processing but remained therein.

Time reversal processing is applied on the forward scattered wave 2 remained in each of the elements 5a of the transducer array 5 due to the vector addition processing, and the sound pulse on which the time reversal processing is applied is radiated towards the direction where the sound source 4 is placed from each of the elements 5a of the transducer array 5. Here, the sound pulses radiated from each of the elements 5a of the transducer array 5 by applying the time reversal processing on the extracted forward scattered wave 2 are converged to the position of the object 1 due to the time reversal theory.

The object 1 is probed by monitoring, on the display, the amplitude distribution of the sound pulses radiated from each of the elements 5a of the transducer array 5 by applying the time reversal processing, particularly the amplitude distribution of the sound pulses with respect to the distance and the depth.

As described above, the exemplary embodiment of the invention is characterized to prove the object 1 existing in the propagation environment 3 by extracting the forward scattered wave 2 from the object 1 based on the reference signal S1 and the mixed signal S3. For extracting the forward scattered wave 2 from the object 1 based on the reference signal S1 and the mixed signal S2, it is important that the phase conjugacy is established in the propagation environment 3 from the sound source 4 to the transducer array 5. The phase conjugation includes active phase conjugation related to the outgoing and incoming paths between the sound source 4 and the transducer array 5 as well as passive phase conjugation related only to the outgoing path from the sound source 4 to the transducer array 5.

The exemplary embodiment of the invention checks whether or not the phase conjugacy is established in the propagation environment 3 from the sound source 4 to the transducer array 5 by employing the passive phase conjugation for determining the reference sound field, and probes the object 1 based on the reference signal S1 and the mixed signal S2 as described above on condition that the phase conjugacy is established.

Next, the feature of the exemplary embodiment of the invention will be checked by a simulation.

Simulation Result:

First, a case where a single object 1 exists in the shallow water 3 will be checked in a simulation. As a method for checking that the components of the traveling wave 6 can be eliminated when performing vector addition of the reference signal S1 and the mixed signal S2, the time reversal processing is applied on the signal of the forward scattered wave 2, and the sound pulse acquired based on the processing is radiated towards the sound source 4 in the shallow water 3 from each of the elements 5a of the transducer array 5. The amplitude distribution of the radiated sound pulses is studied to check that the sound pulses converge to the position of the object 1.

The sound source 4 and the transducer array 5 are opposed to each other in the shallow water 3 of 100 m in depth, and the object 1 is placed therebetween. The distance between the sound source 4 and the transducer array 5 is 3 km, and the distance between the sound source 4 and the object 1 is 1.5 km. The depth of both the sound source 4 and the object 1 is 50 m. Regarding the size of the object 1, the height and the width thereof are both 2 m. A tone burst wave of 8 cycles and the center frequency of 500 Hz is radiated into the shallow water 3 from the sound source 4 as the sound pulse, and received by the transducer array 5. After applying the time reversal processing thereon, the sound pulse acquired based on the processing is re-radiated into the shallow water 3 from the transducer array 5.

FIG. 7 is a chart showing the amplitude distribution of the sound pulse in a case where the time reversal processing is applied on the mixed signal S2 and then it is radiated from the transducer array 5. In FIG. 7, the distance 0 m is the position of the sound source 4, and it is evident that the sound pulse converges to the position of the sound source 4. However, the sound pulse does not converge to the position of the object 1 that exists at the position of distance 1.5 km with respect to the sound source 4 (convergence of the sound pulse cannot be observed). That is, it cannot be observed since the forward scattered wave 2 is masked by the components of the traveling wave 6. In the charts showing the amplitude distribution of the sound pulse presented hereinafter including FIG. 7, a part where the sound pressure of the sound pulse from the transducer array 5 is strong is shown in white, a part where the sound pressure is weak is shown in black, and the sound pressure of the levels therebetween is shown in gray with gradations (become closer to white in proportion to the level thereof). Further, in the charts showing the amplitude distribution of the sound pulse, the longitudinal axis is the depth (m), and the lateral axis is the distance (km).

FIG. 8 is a distribution chart showing the amplitude of the sound pulse sent from the transducer array 5 by applying the time reversal processing on the remaining signal (the forward scattered wave 2) after applying the vector addition processing on the mixed signal S2 and the reference signal S1.

In FIG. 8, it can be seen that the position at the distance of 1.5 km is the position of the object 1, and that the sound pulse projected from the transducer array 5 converges to the position of the object 1. Further, it can be seen that the sound pulse projected from the transducer array 5 does not converge to the position of the sound source 4 existing at the position of 0 km in distance and 50 m in depth.

Therefore, from the result of simulations shown in FIG. 7 and FIG. 8, that the method of performing the vector addition processing of the mixed signal S2 and the reference signal S1 is confirmed to be effective as a method for isolating (extracting) only the forward scattered wave 2. Further, even when the position of the object 1 is changed, it is confirmed that the sound pulse projected from the transducer array 5 by applying the time reversal processing on the remaining signal (the forward scattered wave 2) after performing the vector addition processing on the mixed signal S2 and the reference signal S1 converges to the position of the object 1 whose position is being changed.

Next, a simulation result of a case of probing a plurality of objects 1 disposed vertically is studied. For executing this simulation, two objects 1 were disposed in the vertical direction. The two objects 1 were placed at the distance of 1.5 km with respect to the sound source 4 while setting the depths of 40 m and 60 m, respectively.

In this case, the amplitude distribution of the sound pulse projected from the transducer array 5 by applying the time reversal processing on the remaining signal (the forward scattered wave 2) after performing the vector addition processing on the mixed signal S2 and the reference signal S1 is shown in FIG. 9.

As can be seen from FIG. 9, it was confirmed that each of the objects 1 disposed vertically can be probed with one-time time reversal processing even in a case where the sizes of the objects 1 are the same.

With the probing method proposed in Non-Patent Document 1 shown in the section of BACKGROUND ART, it is necessary to repeat the time reversal processing for twice or more. In addition, it is difficult to discriminate the objects when the sizes of the objects are the same. Compared to that, the effectiveness of the method proposed by the exemplary embodiment of the invention is more distinct.

Based on the technical analysis and the simulation results described above, the exemplary embodiment of the invention probes the object 1 existing within the propagation environment 3 by extracting the forward scattered wave 2 from the object 1 based on the reference signal S1 received in the reference sound field and the mixed signal S2 received in the probe sound field in the layout of the sound source 4 and the transducer array 5 shown in FIG. 2. Moreover, the exemplary embodiment checks whether or not the phase conjugacy is established in the propagation environment 3 from the sound source 4 to the transducer array 5 by employing the passive phase conjugation for determining the reference sound field, generates a time-reversed sound pulse and re-radiates it by applying the time reversal processing on the extracted forward scattered wave 2, on condition that the phase conjugacy is established. Hereinafter, the exemplary embodiment of the invention will be described in details by using a specific example.

As shown in FIG. 1, as the basic structure, an object probing device according to the exemplary embodiment of the invention includes an addition processing unit 6, a time reversal processing unit 7, a phase conjugation determination unit 8, and a convergence calculation processing unit 9.

A control unit 12 comprehensively controls each of the structural elements (e.g., the addition processing unit 6, the time reversal processing unit 7, the phase conjugation determination unit 8, and other structural elements) shown in FIG. 1. 14 is a storage unit which provides information required for operations of the control unit 12 and a work area required for arithmetic operations, and 13 is an indication unit such as a display or a printer which outputs data outputted via the control unit 12.

There are the addition processing units 6 in the same number as that of the elements 5a provided by corresponding to the elements 5a of the transducer array 5. Further, the addition processing unit 6 stores the reference signal S1 in the reference sound field received at each element 5a of the transducer array 5, which, is the sound pulse (the sound pulse of the normal phase) projected from the sound source 4 in the reference sound field where there is no object 1, by a unit of the element 5a. Furthermore, the addition processing unit 6 acquires the mixed signal S2 in the probe sound field, which is the sound pulse of the inverted phase from that of the sound pulse projected from the source 4 earlier in the probe sound field considered to have the object 1 existing therein projected and received at each element 5a of the transducer array 5. Further, the addition processing unit 6 extracts the forward scattered wave 2 from the object 1 based on the reference signal S1 and the mixed signal S2 by the vector addition processing.

The addition processing unit 6 receives a signal that is the signal received at each element 5a of the transducer array 5 and converted from an analog signal to a digital signal by a time window/AD conversion unit 10. There are the time window/AD conversion units 10 in the same number as that of the elements 5a provided by corresponding to each of the elements 5a of the transducer array 5.

The time reversal processing unit 7 receives the signals of the forward scattered waves 2 from the object 1 extracted through performing the vector addition processing on the respective mixed signals S2 and reference signals 1 by two or more addition processing units 6, applies the time reversal processing on the extracted forward scattered waves 2, and generates time-reversed sound pulses.

The phase conjugation determination unit 8 checks whether or not the phase conjugacy is established in the propagation environment 3 from the sound source 4 to the transducer array 5 by employing the passive phase conjugation to the time-reversed sound pulses generated by the time reversal processing unit 7, and outputs the determined result.

The convergence calculation processing unit 9 receives the sound pulses generated by the time reversal processing unit 7 and calculates the convergence position of the sound pulses on condition that it is determined by the phase conjugation determination unit 8 that the phase conjugacy is established.

Next, a case of probing the object 1 existing in the shallow water 3 as the propagation environment by using the object probing device according to the exemplary embodiment of the invention will be described.

First, in a prestage of performing probing, a calibration signal is projected into the shallow water 3 from the sound source 4, received at one of the elements 5a of the transducer array 5, and the received signal is transmitted to an environmental information generation unit 11. The environmental information generation unit 11 fetches the received signal, eliminates an unnecessary signal, performs A/D conversion thereon, and uses it as the calibration signal. Further, the environmental information generation unit 11 calculates constants of the actual sea area, i.e., constants (acoustic constants in the sea) of the actual sea area where the sonic beam propagates, based on the calibration signal. This will be described in a specific manner.

The object probing device according to the exemplary embodiment of the invention is used in a relatively shallow area of the sea such as a continental shelf. The acoustic constants of the sea regarding the sonic propagation under such environment are data of the depth of the water, sound speed in the seawater, seabed sediments (sound speed, density), and the like. Further, the acoustic constants of the sea regarding the sound pulse in the environment is data of the center frequency of the sound pulse, the spectrum of the sound pulse, the band width of the sound pulse, and the like. The data of the water depth for determining the acoustic constant of the sea can be acquired though conducting a direct measurement by using a measuring device such as a sounder. The seawater sound speed data for determining the acoustic constant of the sea can be acquired from a known sound speed formula such as Medwin (H. Medwin) formula by measuring the water temperature.

Regarding the data of the seabed sediments for determining the acoustic constant of the sea, approximate values can be estimated from a sea chart or the like. However, more accurate values can be acquired by a known calibration method. That is, the data of the sediment in the actual sea area is acquired by projecting, within the probing region where the object does not exist, a calibration signal sound into the shallow water 3 from the sound source 4, receiving it by the transducer array 5, and performing an arithmetic operation while changing the received signal and the predicted seabed sediment constant. Note here that the acoustic constant of the sea means an environmental factor which is a factor influencing upon the propagation of a sonic wave when the sonic wave actually propagates in the sea. While the sea acoustic constants are used herein since assumed is the case of probing the object 1 in the sea, the constants are not limited only to that. In a case where the propagation environment is other than the sea, the acoustic constant is an environmental factor that is a factor influencing upon the propagation of a sonic wave when the sonic wave actually propagates that propagation environment.

The data for determining the acoustic constant of the sea in the actual sea area regarding the sonic wave propagation and sound pulse is inputted in the environmental information generation unit 11. The environmental information generation unit 11 determines the acoustic constant of the sea in the actual sea area based on the inputted data for determining the acoustic constant of the sea and the calibration signal. The environmental information generation unit 11 outputs the determined acoustic constant of the sea in the actual sea area to the convergence calculation unit 9. While the sea acoustic constants are used herein since assumed is the case of probing the object 1 in the sea. However, the constants are not limited only to that. In a case where the propagation environment is other than the sea, the environmental information generation unit 11 outputs the actual acoustic constant that is a factor influencing upon the propagation of the sonic wave when the sonic wave actually propagates in the propagation environment.

At a point where the processing of the environmental information generation unit 11 is ended, the sound pulse is radiated into the shallow water 3 from the sound source 4 in the reference sound field under the state where there is no object 1 existing between the sound source 4 and the transducer array 5. Each of the elements 5a of the transducer array 5 acquires the sound pulse propagated in the shallow water 3 as the reference signal S1 in the reference sound field.

Each element 5a of the transducer array 5 outputs the acquired reference signal S1 (electric signal) in the reference sound field to the time window/AD conversion unit 10. Upon receiving the reference signal S1, the time window/AD conversion unit 10 converts the reference signal S1 from an analog signal to a digital signal, and outputs converted signal to the addition processing unit 6.

The addition processing unit 6 receives the reference signals S1 outputted from all the time window/AD converters 10, and stores those signals.

Then, in the probe sound field under a state considered to have the object 1 existing between the sound source 4 and the transducer array 5, a sound pulse in a relation of inverted phase from the sound pulse radiated from the sound source 4 in the reference sound field is radiated into the shallow water 3 from the sound source 4. Each of the elements 5a of the transducer array 5 acquires the sound pulse propagated in the shallow water 3 as the mixed signal S2 in the probe sound field.

Each element 5a of the transducer array 5 outputs the acquired mixed signal S2 (electric signal) to the time window/AD conversion unit 10. Upon receiving the mixed signal S2, the time window/AD conversion unit 10 converts the reference signal S2 from an analog signal to a digital signal, and outputs the converted mixed signal S2 to the addition processing unit 6.

The addition processing unit 6 receives the mixed signals S2 outputted from all the time window/AD conversion units 10 and applies the vector addition processing on the reference signal S1 and the mixed signal S2 at the time of acquiring the reference signal S1 and the mixed signal S2 to extract the signal of the forward scattered wave 2 from the object 1 from which the component of the traveling wave 6 is eliminated (step 100 of FIG. 4). Then, the addition processing unit 6 outputs the extracted forward scattered wave 2 to the time reversal processing unit 7.

The vector addition processing executed by the addition processing unit 6 will be described in details. The phase of the sound pulse radiated from the sound source 4 in the reference sound field is a normal phase. The phase of the sound pulse radiated from the sound source 4 in the probe sound field is an inverted phase, and the phases of the reference signal S1 and the mixed signal S2 received in each of the elements 5a of the transducer array 5 are in an inverted relation from each other. The reference signal S1 contains the component of the traveling wave 6 directly arrived at the element 5a of the transducer array 5 from the sound source 4. The mixed signal S2 contains the forward scattered wave 2 scattered forward from the object 1 in addition to the component of the traveling wave 6 directly arrived at the element 5a of the transducer array 5 from the sound source 4, when there is the object 1 existing in the probe sound field. In that case, the phases of the reference signal S1 and the mixed signal S2 are inverted phases from each other, and the component of the traveling wave 6 in the reference signal S1 and the component of the traveling wave 6 in the mixed signal S2 are in a relation of inverted phases from each other. Therefore, the addition processing unit 6 offsets the component of the traveling wave 6 in the reference signal S1 and the component of the traveling wave 6 in the mixed signal S2 by executing the vector addition processing, and extracts only the forward scattered wave 2 in the mixed signal S2.

The time reversal processing unit 7 receives the signals of the forward scattered waves 2 outputted from the two or more addition processing units 6, and applies the time reversal processing on the extracted forward scattered waves 2 to generate the time-reversed sound pulses (step 101 of FIG. 4). Then, the time reversal processing unit 7 outputs the generated sound pulses to the convergence calculation unit 9.

Next, the time reversal processing executed by the time reversal processing unit 7 will be described in details. In order to return the forward scattered wave 2 extracted by the addition processing unit 6 to the dispatching source of the wave, it is necessary to invert the time axis according to the time reversal theory. Thus, the time reversal processing unit 7 applies the time reversal processing on the forward scattered wave 2 to generate the time-reversed sound pulse that is directed towards the object 1 from the element 5a of the transducer array 5.

Upon receiving the sound pulse such as the calibration signal, which is radiated in the reference sound field from the sound source 4 and received by the transducer array 5, the phase conjugation determination unit 8 applies the passive phase conjugation shown in formulae (1) and (2) to the sound pulse to determine the phase conjugacy (step 102 of FIG. 4).

[Expression 1]

$$R_{id}(\vec{r}_m; t) \int_0^T P_d(\vec{r}_m; t'+t) P_i(\vec{r}_m; t') dt' \quad (1)$$

$$S(t) = \sum_{m=1}^{M} w_m R_{id}(\vec{r}_m; t) \quad (2)$$

Note here that $P_i(r_m;t)$ is a reference signal, and $P_d(\vec{r}_m;t)$ is a data signal. The right side of formula (1) shows a correlation between the reference signal and the data signal, and the result of the correlation is $R_{id}(\vec{r}_m;t)$. Since the reference signal and the data signal are the same in a case of probing an object in the propagation environment, $R_{id}(\vec{r}_m;t)$ is an autocorrelation function.

Formula (2) needs to apply in a case where the propagation environment 3 in the reference sound field exhibits the phase conjugacy. The phase conjugation determination unit 8 investigates the similarity between the autocorrelation function of the sound pulse projected from the sound source 4 in the propagation environment 3 in the reference sound field and S(t) shown by formula (2) as a correlation result acquired by adding the autocorrelation functions of the reference signals S1 received at all the elements 5a of the transducer array 5, and determines that the propagation environment 3 in the reference sound field exhibits the phase conjugacy when judged that those are similar.

For extracting the forward scattered wave 2 from the object 1 based on the reference signal S1 and the mixed signal S2, it is important that the phase conjugacy is established in the propagation environment 3 from the sound source 4 to the transducer array 5. As shown in FIG. 2, the phase conjugation includes active phase conjugation related to the outgoing and incoming paths between the sound source 4 and the transducer array 5 as well as passive phase conjugation related only to the outgoing path from the sound source 4 to the transducer array 5.

As described above, the phase conjugation determination unit 8 checks whether or not the phase conjugacy is established in the propagation environment 3 from the sound source 4 to the transducer array 5 by employing the passive phase conjugation for determining the reference sound field to determine whether or not the phase conjugacy is established.

Next, a case of determining the phase conjugacy in the reference sound field by using the phase conjugation determination unit 8 will be described in a specific manner based on FIG. 3 created according to formula (1) and formula (2).

FIG. 3A shows an autocorrelation waveform of the sound pulse of a tone burst wave with the center frequency of 500 Hz as shown in FIG. 6A and FIG. 6B radiated from the sound source 4. Here, the repeated cycle of the sound pulse projected from the sound source 4 is set as 10 seconds, so that observed is a waveform that is symmetrical with respect to the 10-second point. FIG. 3B is a waveform according to formula (1). Here, it is an autocorrelation waveform of m=1, i.e., a waveform of the sound pulse received at the first element 5a among the elements 5a of the transducer array 5.

[Expression 2]

$$R_{id}(\vec{r}_1; t)$$

The distance between the sound source 4 and the element 5a of the transducer array 5 in this case is 3 km, the water depth is 100 m, and the depth at which the sound source 4 is placed is 50 m. There are sixty elements 5a of the transducer array 5 disposed at an interval of a half wavelength. The waveform is the autocorrelation function waveform of the sound pulse received at the first element 5a among the sixty elements 5a. It can be seen that the pulse width is extended considerably.

FIG. 3C corresponds to S(t) of formula (2). That is, the autocorrelation of the sound pulse received at the m-th element 5a, i.e., [Expression 3] $R_{id}(\vec{r}_1;t)$, is added for the number of elements 5a (sixty in this case). In FIG. 3C, [Expression 4] $R_{id}(\vec{r}_1;t)$ is added for the number of all the elements, so that the sound pulse is compressed.

Therefore, the phase conjugation determination unit 8 investigates the similarity between the autocorrelation function of the sound pulse radiated from the sound source 4 shown in FIG. 3A, which is projected from the sound source 4 in the propagation environment 3 in the reference sound field and received by the transducer array 5, and the autocorrelation function waveform of S(t) shown in FIG. 3C which is the correlation result acquired by adding the autocorrelation functions of the reference signals S1 received at all the elements 5a of the transducer array 5, and determines that the propagation environment 3 in the reference sound field exhibits the phase conjugacy when judged that those are similar.

In the case of FIG. 3, the autocorrelation function waveform shown in FIG. 3A and the autocorrelation waveform shown in FIG. 3C are similar. Thus, the phase conjugation determination unit 8 determines that it is the propagation environment 3 in the reference sound field, and outputs the determined result to the convergence calculation processing unit 9 (YES in step 102 of FIG. 4).

In a case where the autocorrelation function waveform shown in FIG. 3A and the autocorrelation waveform shown in FIG. 3C are not similar, the phase conjugation determination unit 8 determines that it is not in the reference sound field. In that case, the phase conjugation determination unit 8 continues the determination processing in a specific standby time corresponding to the probing sea area until it is determined that the environment is in the reference sound field (NO in step 102 of FIG. 4).

The convergence calculation processing unit 9 receives the time-reversed sound pulse from the time reversal processing unit 7 and receives the result determined by the phase conjugation determination unit 8 that it is in the reference sound field, and calculates the convergence position of the sound pulse in the probe sound field based on a following formula (3) (step 103 of FIG. 4).

Formula (3) is the sound pulse which is subjected to the time reversal processing, re-radiated from the transducer array 5, and received at an arbitrary point, which shows the sound pressure of the sound pulse in the time region.

[Expression 5]

$$P(r, z, t) = \sum_{m=1}^{M} \int G_\omega(r, z, z_m) S_r^*(\omega) e^{-i\omega t} d\omega \quad (3)$$

Note here that r and z are the distance and the depth of the point to be acquired, and $G_w(r, \vec{z}, z_m)$ is a Green's function affecting on the point $(\vec{r}, z)$ from an array element $\vec{z}_m$. $S_r(\vec{\omega})$ is a spectrum of a time-reversed scattered wave. The sound fields of the entire probing region are acquired by using the formula while changing r and z, i.e., the distance and depth.

Upon receiving the output from the convergence calculation processing unit 9, the control unit 12 displays the amplitude distribution of the sound pulse with GUI on the screen of the indication unit 13. The operator monitors the amplitude distribution of the sound pulse (e.g., FIG. 8, FIG. 9) displayed on the screen of the indication unit 13 to probe the object 1 existing within the propagation environment 3.

As described above, the exemplary embodiment of the invention extracts the forward scattered wave scattered forward at the object by applying the vector addition processing on the reference signal acquired in the reference sound field and the mixed signal acquired in the probe sound field, applies the time reversal processing on the extracted forward scattered wave, and converges it to the position of the object to probe the object in the propagation environment.

Further, the exemplary embodiment of the invention checks whether or not the phase conjugacy is established in the propagation environment from the sound source to the transducer array by employing the passive phase conjugation for determining the reference sound field, and probes the object 1 in the propagation environment based on the reference signal and the mixed signal as described above on condition that the phase conjugacy is established. Therefore, it is possible to probe the object accurately and surely.

With the method proposed by C. Prada et al., i.e., the method which repeats the time reversal processing on the backward scattered waves which scatter (reflect) backward from an object, it is necessary to repeat the time reversal processing twice or more. Thus, it takes a tremendous amount of time for probing the object. In the meantime, the exemplary embodiment of the invention can probe the object by executing the time reversal processing once, so that the time required for probing can be shortened.

While the case of using the object probing device according to the exemplary embodiment of the invention for probing the object in the shallow water has been described above, the object probing device is not limited only to be used for probing the object underwater. The present invention may be employed in any propagation environments as long as the sound pulse can propagate therein, and the present invention makes it possible to probe the objects in the propagation environments. Further, while the case of building the exemplary embodiment of the invention as hardware has been described above, the present invention is not limited only to such case. That is, the functions executed by the object probing device according to the present invention may be achieved by building the functions executed by the object probing device according to the present invention as a program and causing a computer to execute the program. In that case, the program is recorded on a recording medium, and the program in that state becomes a target of a commercial transaction.

This Application claims the Priority right based on Japanese Patent Application No. 2008-287202 filed on Nov. 7, 2008 and the disclosure thereof is hereby incorporated by reference in its entirety.

INDUSTRIAL APPLICABILITY

The present invention can be directed to a wide range of probed objects as the targets, and makes it possible to easily probe those probed objects.

BRIEF DESCRIPTION OF THE DRAWINGS

FIG. 2 is a chart for describing a theory for determining a reference sound field in the exemplary embodiment of the invention;

FIG. 3 shows waveform charts which illustrate determinations of a phase conjugacy executed by a phase conjugation determination unit;

FIG. 4 is a flowchart showing a case where an object is probed by using the object probing device according to the exemplary embodiment of the invention;

FIG. 5 is a chart showing a relation between a backward scattered wave and a forward scattered wave based on a sound pulse making incident on an object;

REFERENCE NUMERALS

Figure 1:
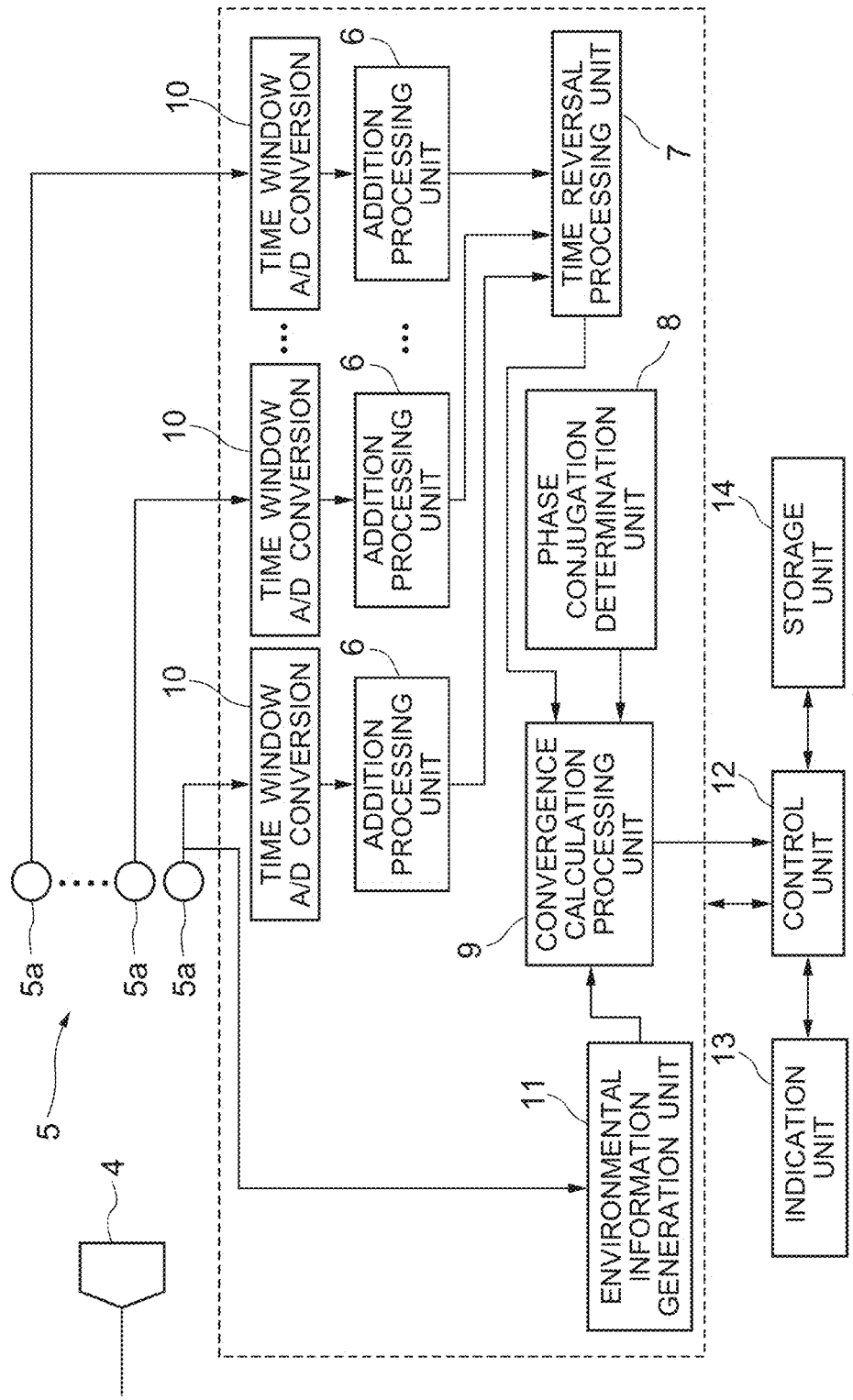
FIG. 1 is a block diagram showing an object probing device according to an exemplary embodiment of the invention.
Figure 6A:
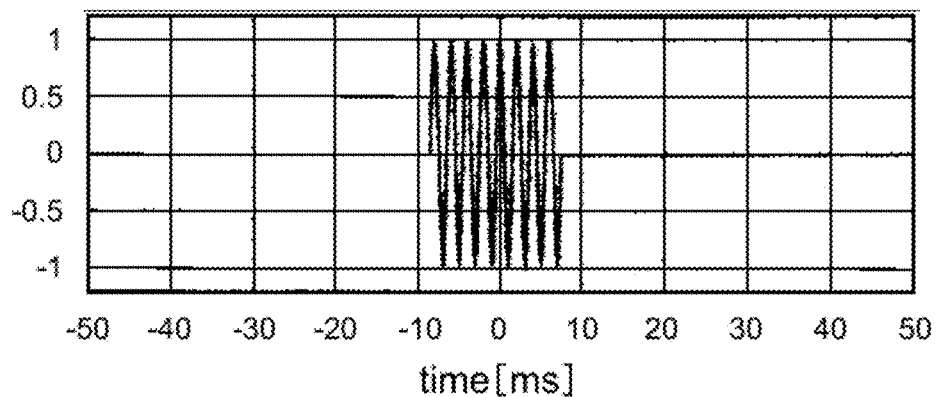
FIG. 6 shows charts of tone burst waves projected from a sound source.
Figure 6B:
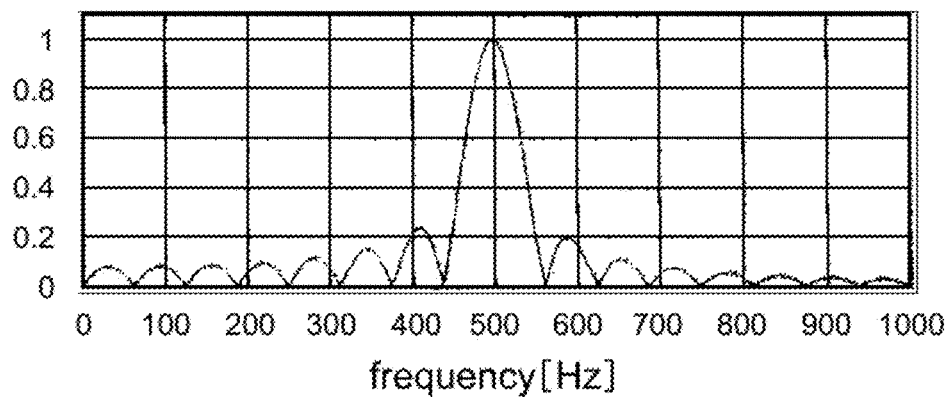
Figure 7:
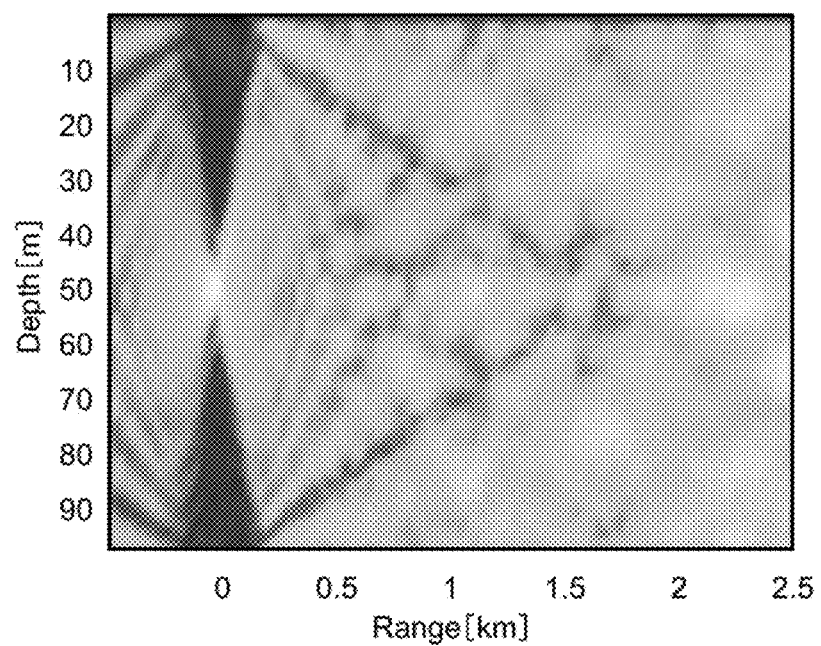
FIG. 7 is a chart showing an amplitude distribution of the sound pulse acquired as a result of a simulation conducted in the exemplary embodiment of the invention.
Figure 8:
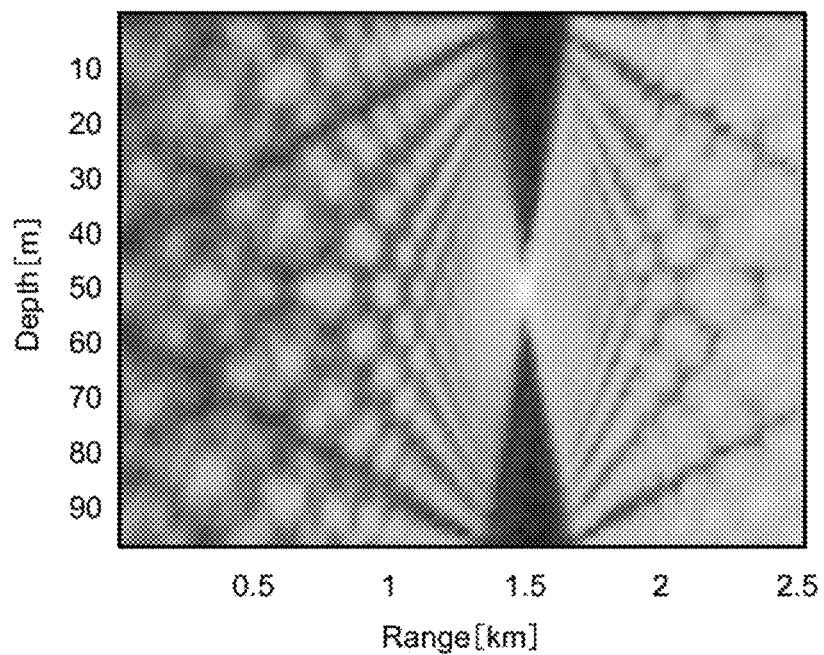
FIG. 8 is a chart showing an amplitude distribution of the sound pulse acquired as a result of a simulation conducted in the exemplary embodiment of the invention.
Figure 9:
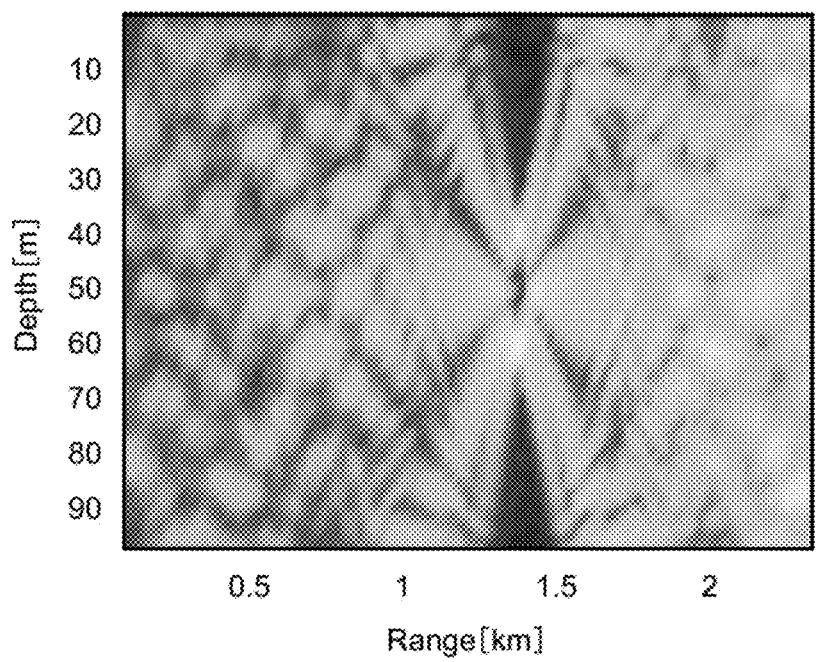
FIG. 9 is a chart showing an amplitude distribution of the sound pulse acquired as a result of a simulation conducted in the exemplary embodiment of the invention.

1 Object
2 Forward scattered wave
3 Propagation environment
4 Sound source
5 Transducer array
7 Addition processing unit
8 Time reversal processing unit
9 Convergence calculation processing unit
S1 Reference signal
S2 Mixed signal

The invention claimed is:

1. An object probing device for probing an object existing in a propagation environment, which probes the object by using a forward scattered wave scattered forward from the object, wherein;
   a sound field in which a sound pulse is projected from a sound source for projecting the sound pulse within the propagation environment and received by a transducer array under a state where the object does not exist in the propagation environment is defined as a reference sound field, a sound pulse received by the transducer array in the reference sound field is defined as a reference signal, a sound field in which a sound pulse is projected from the sound source and received by the transducer array under a state where the object exists in the propagation environment is defined as a probe sound field, and a sound pulse received by the transducer array in the probe sound field is defined as a mixed signal, the device comprising:

the transducer array disposed in a region for receiving the forward scattered wave scattered forward from the object existing in the propagation environment receiving the sound pulse of the reference signal in the reference sound field, and receiving, in the probe sound field, the sound pulse of the forward scattered wave scattered forward from the object existing in the propagation environment;

an addition processing unit which extracts only a signal of the forward scattered wave by applying vector addition processing data of the reference signal in the reference sound field and data of the mixed signal in a probe sound field;

a time reversal processing unit which generates a time-reversed sound pulse by applying time reversal processing on the forward scattered wave extracted by the addition processing unit;

a phase conjugation determination unit which investigates a similarity between an autocorrelation function of the sound pulse projected from the sound source in the propagation environment in the reference sound field and a correlation result acquired by adding the autocorrelation functions of the reference signals received at the transducer array, and determines that the propagation environment in the reference sound field exhibits a phase conjugacy when judged that those are similar; and a convergence calculation processing unit which calculates a position to which the time-reversed sound pulse generated by the time reversal processing unit converges, on condition that it is determined that the phase conjugacy is established.

2. The object probing device as claimed in claim 1, wherein the sound source projects a sound pulse of a normal phase to the propagation environment in the reference sound field, and projects a sound pulse that is in an inverted phase relation from the sound pulse of the normal phase to the propagation environment in the probe sound field.

3. A non-transitory computer readable recording medium storing an object probing program for controlling probing of an object existing in a propagation environment, which probes the object by using a for scattered wave scattered forward from the object, wherein a sound field in which a sound pulse is projected from a sound source for projecting the sound pulse within the propagation environment and received by a transducer array under a state where the object does not exist in the propagation environment is defined as a reference sound field, a sound pulse received by the transducer array in the reference sound field is defined as a reference signal, a sound field in which a sound pulse is projected from the sound source and received by the transducer array under a state where the object exists in the propagation environment is defined as a probe sound field, and a sound pulse received by the transducer array in the probe sound field is defined as a mixed signal, which causes a computer to execute:

a function which extracts only a signal of a forward scattered wave by applying vector addition processing on data of the reference signal which is the sound pulse received in the reference sound field and data of the mixed signal which is the sound pulse of the forward scattered wave scattered forward from the object existing in the propagation environment received in the probe sound field;

a function which investigates a similarity between an autocorrelation function of the sound pulse projected from the sound source in the propagation environment in the reference sound field and a correlation result acquired by adding the autocorrelation functions of the reference signals received at the transducer array, and determines that the propagation environment in the reference sound field exhibits a phase conjugacy when judged that those are similar; and a function which calculates a position to which the time-reversed sound pulse generated by the time reversal processing means converges, on condition that it is determined that the phase conjugacy is established.

4. An object probing method for probing an object existing in a propagation environment, which probes the object by using a forward scattered wave scattered forward from the object, wherein a sound field in which a sound pulse is projected from a sound source for projecting the sound pulse within the propagation environment and received by a transducer array under a state where the object does not exist in the propagation environment is defined as a reference sound field, a sound pulse received by the transducer array in the reference sound field is defined as a reference signal, a sound field in which a sound pulse is projected from the sound source and received by the transducer array under a state where the object exists in the propagation environment is defined as a probe sound field, and a sound pulse received by the transducer array in the probe sound field is defined as a mixed signal, the method comprising:

disposing the transducer array in a region for receiving the forward scattered wave scattered forward from the object existing in the propagation environment, receiving the sound pulse of the reference signal in the reference sound field, and receiving, in the probe sound field, the sound pulse of the forward scattered wave scattered forward from the object existing in the propagation environment;

extracting only a signal of the forward scattered wave by applying vector addition processing on the reference signal in the reference sound field and the mixed signal in the probe sound field;

generating a time-reversed sound pulse by applying time reversal processing on the extracted forward scattered wave;

investigating a similarity between an autocorrelation function of the sound pulse projected from the sound source in the propagation environment in the reference sound field and a correlation result acquired by adding the autocorrelation functions of the reference signals received at the transducer array, and determining that the propagation environment in the reference sound field exhibits a phase conjugacy when judged that those are similar; and calculating a position to which the time-reversed sound pulse generated by the time reversal processing means converges, on condition that it is determined that the phase conjugacy is established.

5. The object probing method as claimed in claim 4, comprising projecting a sound pulse of a normal phase to the propagation environment in the reference sound field, and projecting a sound pulse that is in an inverted phase relation from the sound pulse of the normal phase to the propagation environment in the probe sound field.

6. An object probing device for probing an object existing in a propagation environment, which probes the object by using a forward scattered wave scattered forward from the object, wherein
a sound field in which a sound pulse is projected from a sound source for projecting the sound pulse within the propagation environment and received by a transducer array under a state where the object does not exist in the propagation environment is defined as a reference sound field, a sound pulse received by the transducer array in the reference sound field is defined as a reference signal, a sound field in which a sound pulse is projected from the sound source and received by the transducer array under a state where the object exists in the propagation environment is defined as a probed sound field, and a sound pulse received by the transducer array in the probe sound field is defined as a mixed signal, the device comprising:
the transducer array disposed in a region for receiving the forward scattered wave scattered forward from the object existing in the propagation environment, receiving the sound pulse of the reference signal in the reference sound field, and receiving, in the probe sound field, the sound pulse of the forward scattered wave scattered forward from the object existing in the propagation environment;
addition processing means for extracting only a signal of the forward scattered wave by applying vector addition processing on data of the reference signal in the reference sound field and data of the mixed signal in the probe sound field;
time reversal processing means for generating a time-reversed sound pulse by applying time reversal processing on the forward scattered wave extracted by the addition processing means;
phase conjugation determination means which investigates a similarity between an autocorrelation functions of the sound pulse projected from the sound source in the propagation environment in the reference sound field and a correlation result acquired by adding the autocorrelation functions of the reference signals received at the transducer array, and determines that the propagation environment in the reference sound field exhibits a phase conjugacy when judged that those are similar; and
a convergence calculation processing means which calculates a position to which the time-reversed sound pulse generated by the time reversal processing unit converges, on condition that it is determined that the phase conjugacy is established.

* * * * *

UNITED STATES PATENT AND TRADEMARK OFFICE
CERTIFICATE OF CORRECTION

PATENT NO. : 8,897,095 B2  
APPLICATION NO. : 13/127884  
DATED : November 25, 2014  
INVENTOR(S) : Yoshiaki Tsurugaya et al.

It is certified that error appears in the above-identified patent and that said Letters Patent is hereby corrected as shown below:

In the Specification

Column 11, Line 28: delete:

$$R_{id}(\vec{r}_m; t) \int_0^T P_d(\vec{r}_m; t' + t) P_i(\vec{r}_m; t') dt'$$

" and insert $$R_{id}(\vec{r}_m; t) = \int_0^T P_d(\vec{r}_m; t' + t) P_i(\vec{r}_m; t') dt'$$

--

Signed and Sealed this  
Twenty-third Day of June, 2015

Michelle K. Lee  
*Director of the United States Patent and Trademark Office*